(12) United States Patent
Nagashima

(10) Patent No.: US 7,463,913 B2
(45) Date of Patent: Dec. 9, 2008

(54) SLIDE MECHANISM OF PORTABLE DEVICE AND PORTABLE TELEPHONE

(75) Inventor: Isao Nagashima, Kanagawa (JP)

(73) Assignee: Katoh Electrical Machinery Co., Ltd., Kanagawa (JP)

( * ) Notice: Subject to any disclaimer, the term of this patent is extended or adjusted under 35 U.S.C. 154(b) by 496 days.

(21) Appl. No.: 11/114,834

(22) Filed: Apr. 26, 2005

(65) Prior Publication Data

US 2006/0073858 A1 Apr. 6, 2006

(30) Foreign Application Priority Data

Oct. 1, 2004 (JP) ............................. 2004-290272

(51) Int. Cl.
*H04M 1/00* (2006.01)
(52) U.S. Cl. ................ 455/575.4; 455/575.1; 455/90.3; 379/446; 379/455; 379/454
(58) Field of Classification Search .............. 455/575.4, 455/575.1, 90.3; 379/446, 455, 454
See application file for complete search history.

(56) References Cited

U.S. PATENT DOCUMENTS 7,003,104 B2 * 2/2006 Lee ...................... 379/433.13
7,162,283 B2 * 1/2007 Bae et al. ................. 455/575.4
7,231,039 B2 * 6/2007 Gronroos et al. ....... 379/428.02
2004/0198477 A1 * 10/2004 Jung et al. ............... 455/575.4

FOREIGN PATENT DOCUMENTS

JP 2003-125052 4/2003

* cited by examiner

*Primary Examiner*—Sanh D Phu
(74) *Attorney, Agent, or Firm*—Notaro & Michalos P.C.

(57) ABSTRACT

To provide a slide mechanism of a portable device structured to allow slide operation semiautomatically, and a portable telephone provided with the slide mechanism of the portable device, it comprises a base member 5 mounted on either one of the first casing 2 and the second casing 3, a slider 4 slidably engaged with the base member 5 and mounted on the other of the first casing 2 and the second casing 3, and a slide energizing means 6 provided between the slider 4 and the base member 5. The slide energizing means 6 is constituted of a rotary arm 7 rotatably mounted on either one of the base member 5 and the slider 4, and an energizing member 8 mounted on the other of the base member 5 and the slider 4, allowing the first casing 2 and the second casing 3 to automatically open/close from a predetermined opening/closing position by acting on the rotary arm 7 to energize the rotary arm 7 to rotate from a predetermined rotary position to both of right and left directions.

7 Claims, 10 Drawing Sheets

US 7,463,913 B2

SLIDE MECHANISM OF PORTABLE DEVICE AND PORTABLE TELEPHONE

BACKGROUND OF THE INVENTION

1. Field of the Invention

The present invention relates to a slide mechanism of a portable device which is preferably used when a first casing and a second casing, which constitute the portable device such as a portable telephone, are slid relatively in a linear direction, and a portable telephone including the slide mechanism of the portable device.

2. Description of the Related Art

Among portable telephones as a kind of portable devices, the one with a slide mechanism is in the market. It has a first casing as a transmitter section which is provided with a keyboard section, microphone section and the like on its upper surface, and a second casing as a receiver section which is provided with a display section, speaker section and the like on its upper surface, whereby the state in which the first casing and the second casing are entirely superposed to cover the upper surface of the first casing by the second casing, and the state in which the second casing is slid in the longitudinal direction relative to the first casing to expose the upper surface of the first casing are made possible. As the portable telephone having such a slide mechanism, Japanese Patent Application Laid-open No. 2003-125052 is publicly known.

According to this laid-opened patent application, a slide case in which a slide cover and a locking plate are superposed fixedly is mounted on the lower surface of a second casing, and a slider slidably contained in the slide case is mounted on the upper surface of a first casing, whereby the second casing can be slid relative to the first casing. According to such structure, all relative operation of the first casing and the second casing, that is, slide operation needs to be performed manually, which causes difficulty in operationality.

SUMMARY OF THE INVENTION

The present invention is made to solve the above-described problem, and its object is to provide a slide mechanism of a portable device which is structured to be able to perform slide operation semiautomatically, and a portable telephone including the slide mechanism of the portable device.

The slide mechanism of the portable device according to the present invention to achieve the above object is the slide mechanism for relatively sliding a first casing and a second casing, which constitute the portable device, in a mutually superposed state to be openable/closable in a linear direction, comprising a base member mounted on either one of the first casing and the second casing, a slider slidably engaged with the base member and mounted on the other of the first casing and the second casing, and a slide energizing means provided between the slider and the base member, wherein said base member has a pair of rail portions erected from its bottom surface part at its both side parts, which are structured so that said slider slides by abutting against the rail portions, wherein said slider is provided with guide portions contacting respective side parts of the rail portions at its side end parts, wherein recessed strip portions or projecting strip portions are provided to the respective rail portions on sides contacting the guide portions, and projecting strip portions or recessed strip portions which engage with the recessed strip portions or projecting strip portions are provided to the respective guide portions on sides contacting the respective rail portions, and wherein the slide energizing means is constituted of a rotary arm rotatably mounted on either one of the base member and the slider, and an energizing member mounted on the other of the base member and the slider, allowing the first casing and the second casing to automatically open/close from a predetermined opening/closing position by acting on the rotary arm to energize the rotary arm to rotate from a predetermined rotary position to both of right and left directions.

According to this invention, the slide energizing means is constituted of the rotary arm and the energizing member, and the energizing member allows the first casing and the second casing to automatically open/close from the predetermined opening/closing position by acting on the rotary arm to energize the rotary arm to rotate from the predetermined rotary position to both of right and left directions and accordingly, the first casing and the second casing slide automatically. Therefore, the first casing and the second casing can be slid semiautomatically, and operationality improves.

According to the slide mechanism of the portable device of the present invention, it is preferable that the slide energizing means is constituted of the rotary arm which is pivotally mounted at its one end part on an approximate center part of an one side part side of the base member, and the energizing member which is elastic in a circumferential direction, pivotally fitted at its free end portion on an one end part side with a free end part of the rotary arm as the other end part, and fixed at its other end part to the slider. Further, according to the slide mechanism of the portable device of the present invention, it is preferable that the above-mentioned slide mechanism comprises a base member mounted on either one of the first casing and the second casing, a slider slidably engaged with the base member and mounted on the other of the first casing and the second casing, and a slide energizing means provided between the slider and the base member, and that the base member has a pair of rail portions erected from its bottom surface part at its both side parts, which are structured so that the slider slides by abutting against the rail portions, and the slider is provided with guide portions contacting respective side parts of the rail portions at its both side parts, and recessed strip portions or projecting strip portions are provided to the respective rail portions on sides contacting the guide portions, and projecting strip portions or recessed strip portions which engage with the recessed strip portions or projecting strip portions are provided to the respective guide portions on sides contacting the respective rail portions. Moreover, according to the slide mechanism of the portable device of the present invention, it is preferable that the slide energizing means is provided between the bottom surface part of the base member and the slider, and between the rail portions of the base member and the guide portions of the slider, and constituted of a rotary arm rotatably mounted on either one of the base member and the slider, and an energizing member mounted on the other of the base member and the slider, allowing the first casing and the second casing to automatically open/close from a predetermined opening/ closing position by acting on the rotary arm to energize the rotary arm to rotate from a predetermined rotary position to both of right and left directions.

Still further, according to the present invention, it is preferable that the spring is mounted on the slider and the rotary arm mounted on the base member, and respective free end portions of said spring and said rotary arm are rotatably connected to each other, thereby allowing said slider to be slidably energized from a sliding position with regard to said base member in an opening direction and closing direction.

Furthermore, according to the present invention, the slide energizing means can be a spring.

Further, the portable device including the above-described slide mechanism according to the present invention can be a portable telephone. According to this invention, similarly to the above, the slide energizing means is constituted of the rotary arm and the energizing member, and the energizing member allows the first casing and the second casing to automatically open/close from the predetermined opening/closing position by acting on the rotary arm to energize the rotary arm to rotate from the predetermined rotary position to both of right and left directions. Accordingly, the first casing and the second casing can be slid semiautomatically, and the operationality improves.

As described thus far, according to the slide mechanism of the portable device of the present invention and the portable telephone, the slide energizing means is constituted of the rotary arm and the energizing member, and the energizing member allows the first casing and the second casing to automatically open/close from the predetermined opening/closing position by acting on the rotary arm to energize the rotary arm to rotate from the predetermined rotary position to both of right and left directions, and accordingly, the first casing and the second casing can be slid semiautomatically, and the operationality improves.

DETAILED DESCRIPTION OF THE PREFERRED EMBODIMENTS

Figure 1:
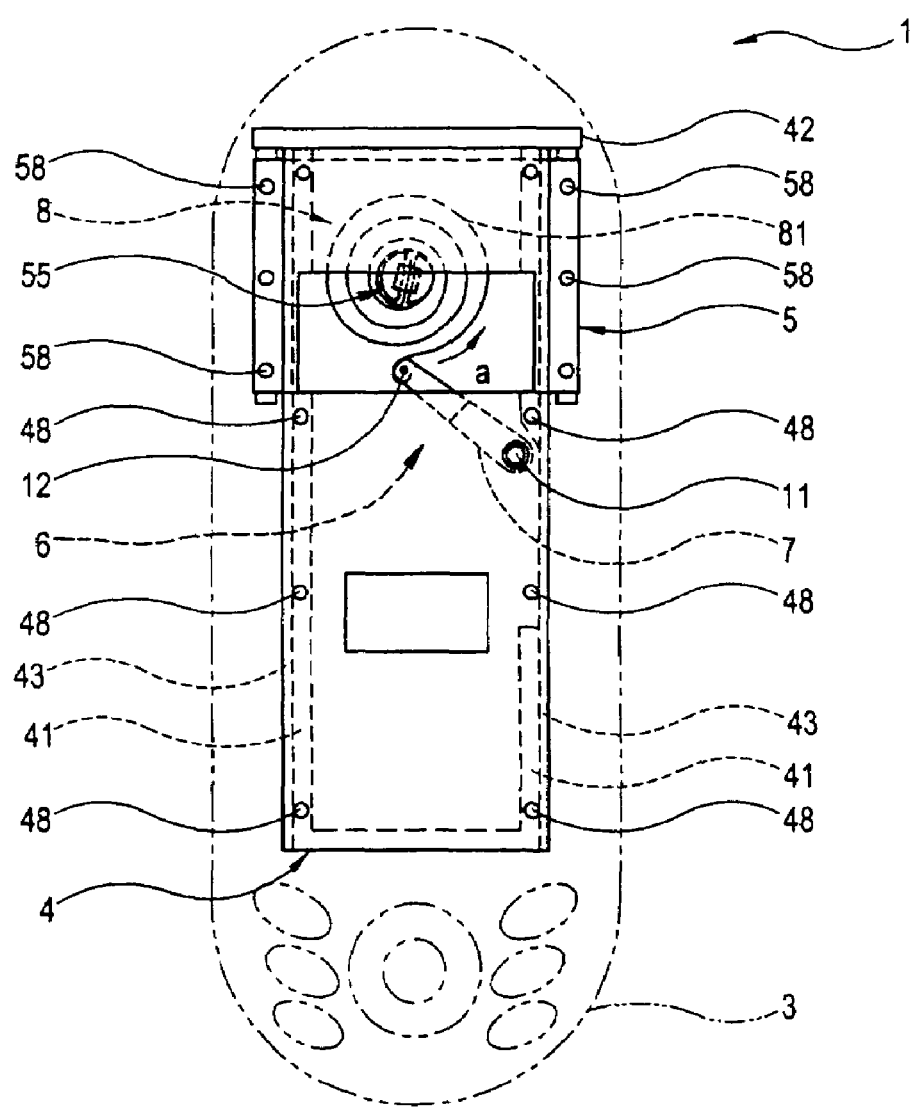
FIG. 1 is a plan view showing a closed state of a slide mechanism of a portable device according to the present invention.

Hereinafter, a slide mechanism of a portable device according to the present invention will be described based on the attached drawings.

FIG. 1 to FIG. 4 show an example of the slide mechanism of the portable device according to the present invention. The slide mechanism of the portable device according to the present invention relatively slides a first casing and a second casing, which constitute the portable device, in a mutually superposed state to be openable/closable in a linear direction. The portable device is not particularly limited, but includes a portable telephone, portable information terminal such as Zaurus (Trademark), calculator, pocket computer, portable game machine and the like, for example. Especially, the portable telephone is preferable. Incidentally, the portable device according to this embodiment includes an ashtray, case lid and the like. Namely, it is not particularly limited as long as the two casings are slid with each other. Although the portable telephone is explained as the portable device according to this embodiment, the present invention is not limited thereto.

As shown in FIG. 1 to FIG. 4, the slide mechanism of the portable device according to the present invention is constituted of a base member 5 which is mounted on either one of a first casing 2 and a second casing 3, a slider 4 which is slidably engaged with this base member 5 and is mounted on the other of the first casing 2 and the second casing 3, and a slide energizing means 6 which is provided between the slider 4 and the base member 5. A slide mechanism 1 of the portable device according to the present invention is characterized in that the slide energizing means 6 is constituted of a rotary arm 7 which is rotatably mounted on either one of the base member 5 and the slider 4, and an energizing member 8 which is mounted on the other of the base member 5 and the slider 4, and allows the first casing 2 and the second casing 3 to automatically open/close from a predetermined opening/closing position by acting on the rotary arm 7 to energize the rotary arm 7 to rotate from a predetermined rotary position to both of right and left directions.

The first casing 2 constitutes a transmitter section of the portable telephone, and has a keyboard section 2a, microphone section and the like on its upper surface. The first casing 2 is formed to have a slender and substantially rectangular shape. Similarly, the second casing 3 constitutes a receiver section of the portable telephone, and has a display section such as an LCD, speaker section and the like on is upper surface. The second casing 3 is formed to have a slender and substantially rectangular shape which is almost the same as the first casing 2. Incidentally, all of the first casings 2 and the second casings 3 are described by imaginary lines in FIG. 1 to FIG. 4.

The base member 5 (which is also referred to as the key base member) is mounted on the upper surface of the first casing 2, for example, and the slider 4 (which is also referred to as the LCD base member) is mounted on the lower surface of the second casing 3, for example.

The slider 4 is mounted on the second casing 3 at its upper part of the lower surface by a thread, screw or the like, for example. As shown in FIG. 1 to FIG. 4 and FIGS. 6(a), 6(b) and 6(c), the slider 4 is formed to have a slender and substantially rectangular shape. At both side parts of the slider 4, there are rail portions 41 and 41 which are formed by being bent almost perpendicularly to a direction orthogonal to a bottom surface 40 (upward in the illustrated example). That is, the slider 4 is formed by press working a metal plate made of stainless steel, for example, in a substantial U-shape. The slider 4 may be a forming made of synthetic resin and the like. Incidentally, in FIGS. 6(a) and 6(b), the numbers 48 denote first mounting holes for mounting the slider 4 on the second casing 3. At an inner wall of each first mounting hole 48, a thread groove is provided, for example.

Further, a mounting hole 45 for mounting one end part of the slide energizing means 6 is provided near one side part of the slider 4 and at the approximate center in its longitudinal direction. A shaft 11 is mounted through the mounting hole 45.

Figure 10:
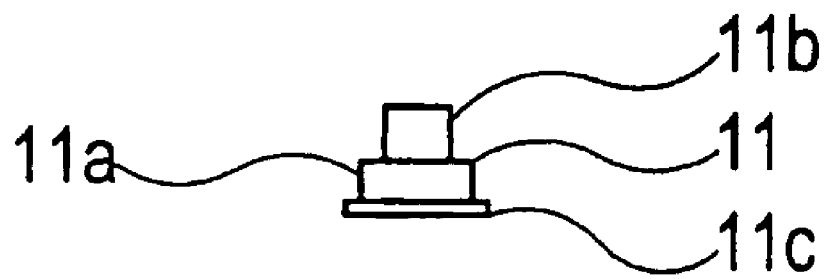
FIG. 10 is a side view showing an example of a shaft according to the present invention.

As shown in FIG. 10, the shaft 11 is constituted of a cylindrical shaft portion 11a whose diameter is smaller, for example, slightly smaller than the diameter of the mounting hole 45, a pivot supporting portion 11b provided coaxially on one end surface of the shaft portion 11a and whose diameter is smaller than the diameter of the shaft portion 11a, and a stopper portion 11c provided coaxially on the other end surface of the shaft portion 11a and whose diameter is larger than the diameter of the mounting hole 45. The pivot supporting portion 11b is inserted into the mounting hole 45 from the back surface of the slider 4 (top surface in the illustrated example) to allow the pivot supporting portion 11b to penetrate therethrough, the shaft portion 11a is inserted into the mounting hole 45, and the stopper portion 11c is abutted against the back surface of the slider 4, whereby the shaft 11 is mounted on the slider 4. Thereby, the shaft 11 is mounted on the slider 4 in the state that the pivot supporting portion 11b of the shaft 11 projects from the surface of the slider 4.

It is preferable that the length of the shaft portion 11a (length in an axial direction) is formed to have the size to project, for example, project slightly from the surface of the slider 4, when mounted through the mounting hole 45 of the shaft 11, as described above. Further, the length of the stopper portion 11c (length in the axial direction) is not particularly limited as long as the rotary arm 7 is rotatable.

On the outer surfaces of the both rail portions 41 and 41 of the slider 4 (surfaces on the opposite side to the surfaces facing each other), engaging recessed portions 43 are respectively formed as recessed strip portions extending in its longitudinal direction. The engaging recessed portions 43 are formed over the entire longitudinal direction of the both rail portions 41 and 41 of the slider 4. A stopper 42 is provided on one end part of the slider 4, and the base member 5 which is engaged with the slider 4 is abutted against the stopper 42 to thereby limit the movement of the slider 4 on one end side. The other end of each engaging recessed portion 43 is open. Moreover, the second casing 3 is provided with a limiting member (not shown) against which the base member 5 which is slidingly engaged with the slider 4 is abutted to limit the movement of the slider 4 on the other end side, when the slider 4 is mounted.

The base member 5 is mounted on the first casing 2 on its upper surface and at its upper part of the keyboard section 2a by the thread, screw and the like, for example. As shown in FIG. 1 to FIG. 4 and FIGS. 7(a), 7(b) and 7(c), the base member 5 is formed to have a substantially rectangular shape. The base member 5 is slidingly engaged with the slider 4, and the length of the base member 5 corresponding to the longitudinal direction of the slider 4 is shorter than the slider 4, for example, it is formed to have the size of approximately one-third.

At both side parts of the base member 5, there are guide portions 51 and 51 which are formed by being bent almost perpendicularly to a direction orthogonal to the surface (downward in the illustrated example). That is, the base member 5 is formed by press working a metal plate made of stainless steel, for example, in a substantial U-shape. The base member 5 may be a forming made of synthetic resin and the like. The length between the inner surfaces of the both side parts (surfaces facing each other) of the base member 5 is formed to have the size greater than, preferably, slightly greater than the length between the outer surfaces of the both end parts of the slider 4. Incidentally, in FIG. 1 to FIG. 3 and FIGS. 7(a) and 7(c), the numbers 58 denote second mounting holes for mounting the base member 5 on the first casing 2. At an inner wall of each second mounting hole 58, a thread groove is provided, for example.

On the inner surfaces of the both guide portions 51 and 51 of the base member 5, engaging projecting portions 53 are respectively formed as projecting strip portions. While the engaging projecting portions 53 and the engaging recessed portions 43 of the slider 4 are engaged with each other, the base member 5 and the slider 4, that is, the first casing 2 and the second casing 3 respectively slide linearly in the longitudinal direction. The both guide portions 51 and 51 of the base member 5 are thus engaged slidingly with the outside of the both rail portions 41 and 41 of the slider 4, whereby the slider 4 and the base member 5 are formed to have a substantially rectangular cylindrical shape (refer to FIG. 4). Incidentally, the engaging projecting portions 53 may be formed over the entire longitudinal direction of the both guide portions 51 and 51 of the base member 5, or a plurality of these may be formed on a part thereof by leaving spaces therebetween. Although the engaging recessed portions 43 are provided on the rail portions 41 and 41 and the engaging projecting portions 53 are provided on the guide portions 51 and 51, the engaging projecting portions may be provided on the rail portions 41 and 41 and the engaging recessed portions may be provided on the guide portions 51 and 51. Further, it is also preferable that the rail portions 41 and 41 and the guide portions 51 and 51 are provided with the recessed portions, respectively, two or more engaging members such as round pins, square pins and the like are inserted and fixed into one of the recessed portions, and tip portions of the engaging members are engaged with the other of the recessed portions.

When the base member 5 is mounted on the first casing 2 in the state that the engaging recessed portions 43 are engaged with the engaging projecting portions 53, that is, the base member 5 and the slider 4 are slidingly engaged, the slider 4 can move slidingly from the state in which the base member 5 abuts against the stopper 42 to the state in which it abuts against the controlling member. The state in which the base member 5 abuts against the stopper 42 is a closed state in which the first casing 2 and the second casing 3 are mutually superposed (refer to FIG. 1). The state in which the base member 5 abuts against the controlling member is an open state (refer to FIG. 3). The state of the predetermined position between the closed state and the open state is a neutral state (refer to FIG. 2). Although the base member 5 is mounted on the first casing 2 and the slider 4 is mounted on the second casing 3, the base member 5 may be mounted on the second casing 3 and the slider 4 may be mounted on the first casing 2.

At the approximate center part of the inner surface of the base member 5 (surface on the side where the guide portions 51 are erected), a fixing portion 55 for fixing the other end part of the energizing member 8 is provided, as shown in FIG. 1 to FIG. 3, FIG. 5 and FIGS. 7(a), 7(b) and 7(c). The fixing portion 55 may be formed in any way as long as the other end part of the energizing member 8 can be detachably fixed. The fixing portion 55 is constituted of, for example, a fitting portion 55a which is projected in a substantially circular shape from the inner surface of the base member 5, and a fitting hole 55b which penetrates the fitting portion 55a in the direction of the diameter of the fitting portion 55a along the inner surface of the base member 5. The fitting portion 55a is divided into two substantially semicircular shapes by the fitting hole 55b. The fixing portion 55 may be provided integrally on the inner surface of the base member 5, or may be provided by being separately fixed thereto by welding and the like.

The slide energizing means 6 is constituted of the rotary arm 7 which is rotatably mounted on either one of the base member 5 and the slider 4, and an energizing member 8 which is mounted on the other of the base member 5 and the slider 4, and allows the first casing 2 and the second casing 3 to automatically open/close from the predetermined opening/closing position by acting on the rotary arm 7 to energize the rotary arm 7 to rotate from the predetermined rotary position to both of right and left directions. The slide energizing means 6 is arranged between the bottom surface 40 of the slider 4 and the base member 5, and between the rail portions 41 and 41 of the slider 4 and the guide portions 51 and 51 of the base member 5.

Figure 8:
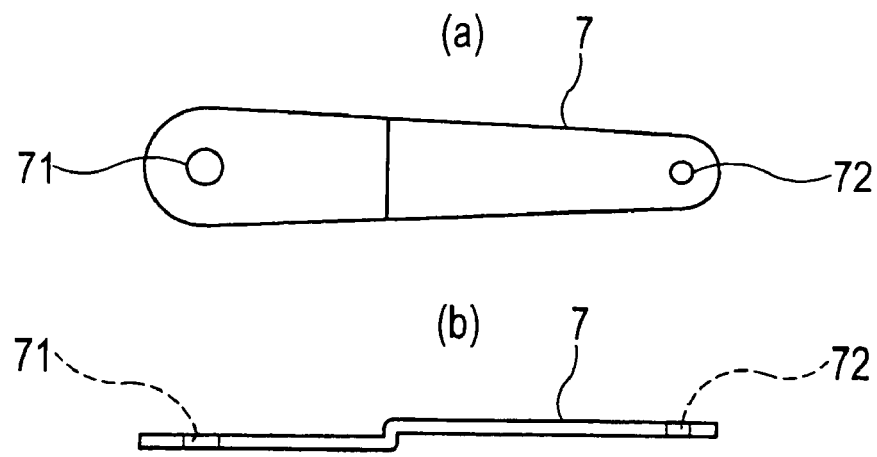
FIGS. 8(a) and 8(b) are views showing an example of the rotary arm according to the present invention, in which 8(a) is a plan view, and 8(b) is a side view.

As shown in FIGS. 8(a) and 8(b), a pivot hole 71 whose diameter is slightly smaller than the diameter of the pivot supporting portion 11b of the shaft 11 is provided on one end part of the rotary arm 7. The rotary arm 7 rotates in parallel to the inner surface of the slider 4 in the state that the pivot supporting portion 11b is inserted into the pivot hole 71. That is, the rotary arm 7 is rotatably pivoted to the slider 4 near one side part thereof via the shaft 11.

Figure 11:
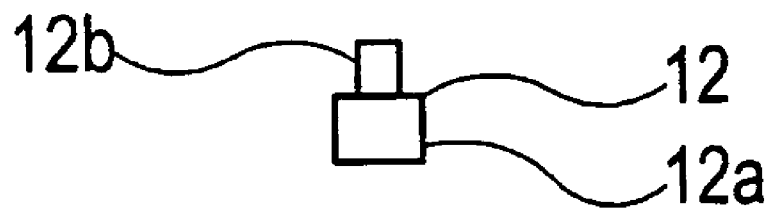
FIG. 11 is a side view showing an example of a pivot pin according to the present invention.

The length of the rotary arm 7 (length in its longitudinal direction) is formed to have the size shorter than the length between the both rail portions 41 and 41 of the slider 4. Further, the approximate center of the rotary arm 7 in the longitudinal direction is formed in a staircase pattern, and the position of a pivot base portion as one end part and the position of a free end portion as the other end part are different in the direction of its plane. At the free end portion of the rotary arm 7, a pivot pin mounting hole 72 is provided. A pivot pin 12 is mounted through the pivot pin mounting hole 72 in such a manner to be erected from the surface of the rotary arm 7. As shown in FIG. 11, the pivot pin 12 is constituted of a cylindrical pivot portion 12a whose diameter is larger than the diameter of the pivot pin mounting hole 72, and a mounting portion 12b provided coaxially on one end surface of the pivot portion 12a and is mounted through the pivot pin mounting hole 72 by being inserted therein.

The energizing member 8 allows the first casing 2 and the second casing 3 to automatically open/close from the predetermined opening/closing position by acting on the rotary arm 7 to energize the rotary arm 7 to rotate from the predetermined rotary position to both of right and left directions. The energizing member 8 includes, for example, a spring 81 (which is also referred to as the spiral spring) which is elastic in a circumferential direction and the like. Incidentally, the energizing member 8 is not limited to the spring 81, and other energizing members may be used to act on the rotary arm 7.

Figure 5:
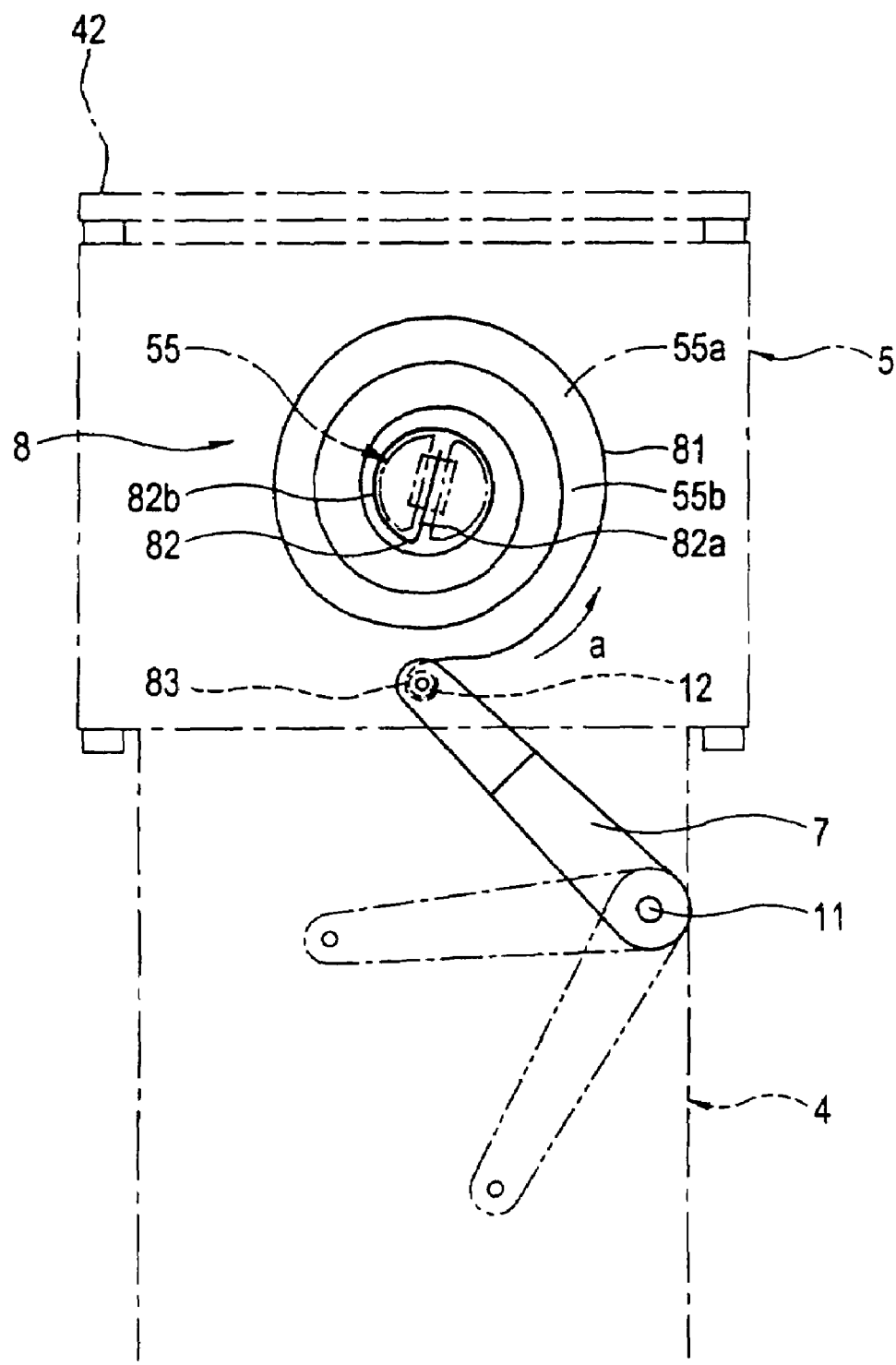
FIG. 5 is a schematic plan view showing an example of a mounting state of a rotary arm according to the present invention and an energizing member according to the present invention.
Figure 6:
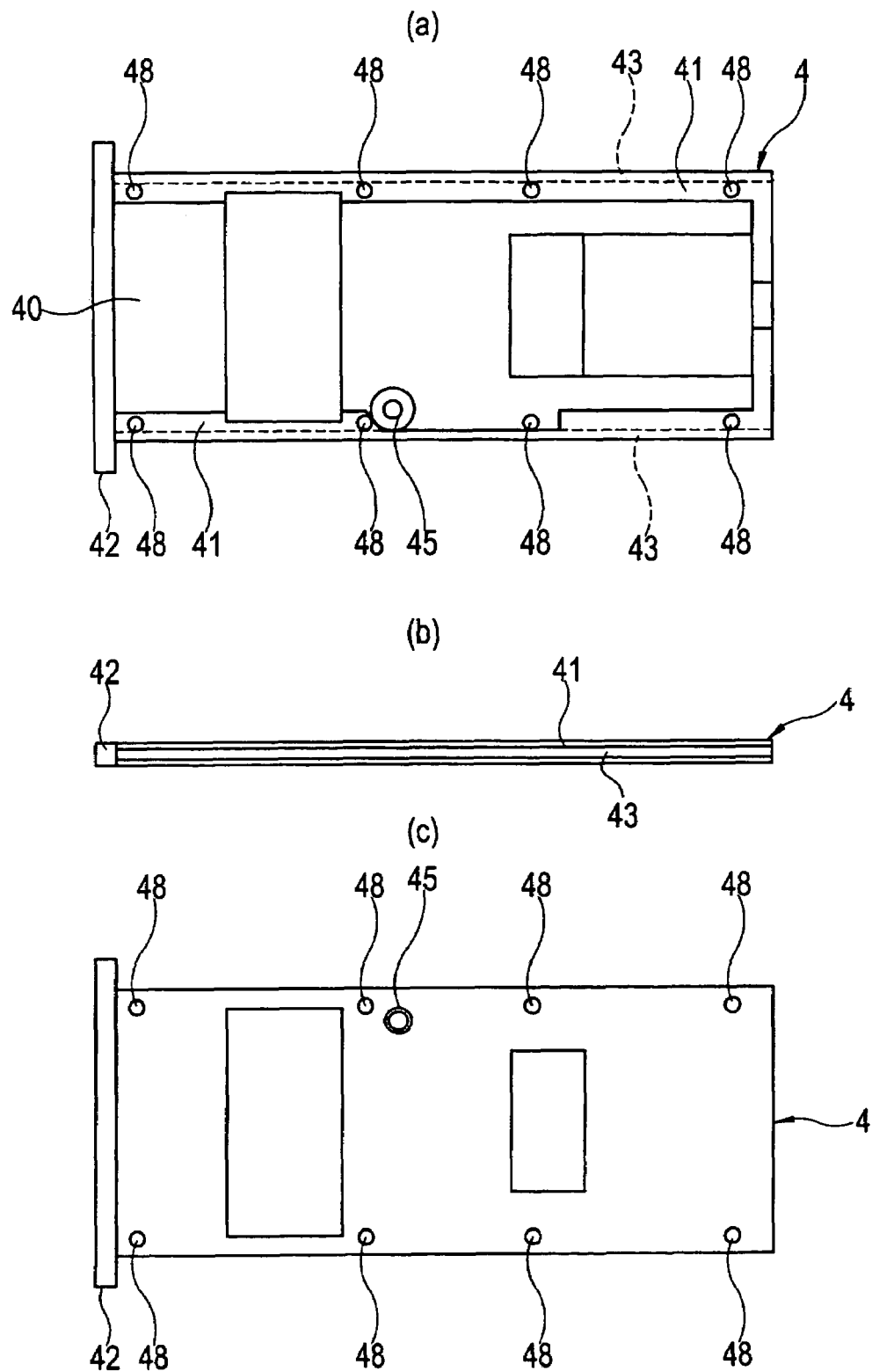
FIGS. 6(a), 6(b) and 6(c) are views showing an example of a slider according to the present invention, in which 6(a) is a plan view, 6(b) is a side view, and 6(c) is a back view.
Figure 7:
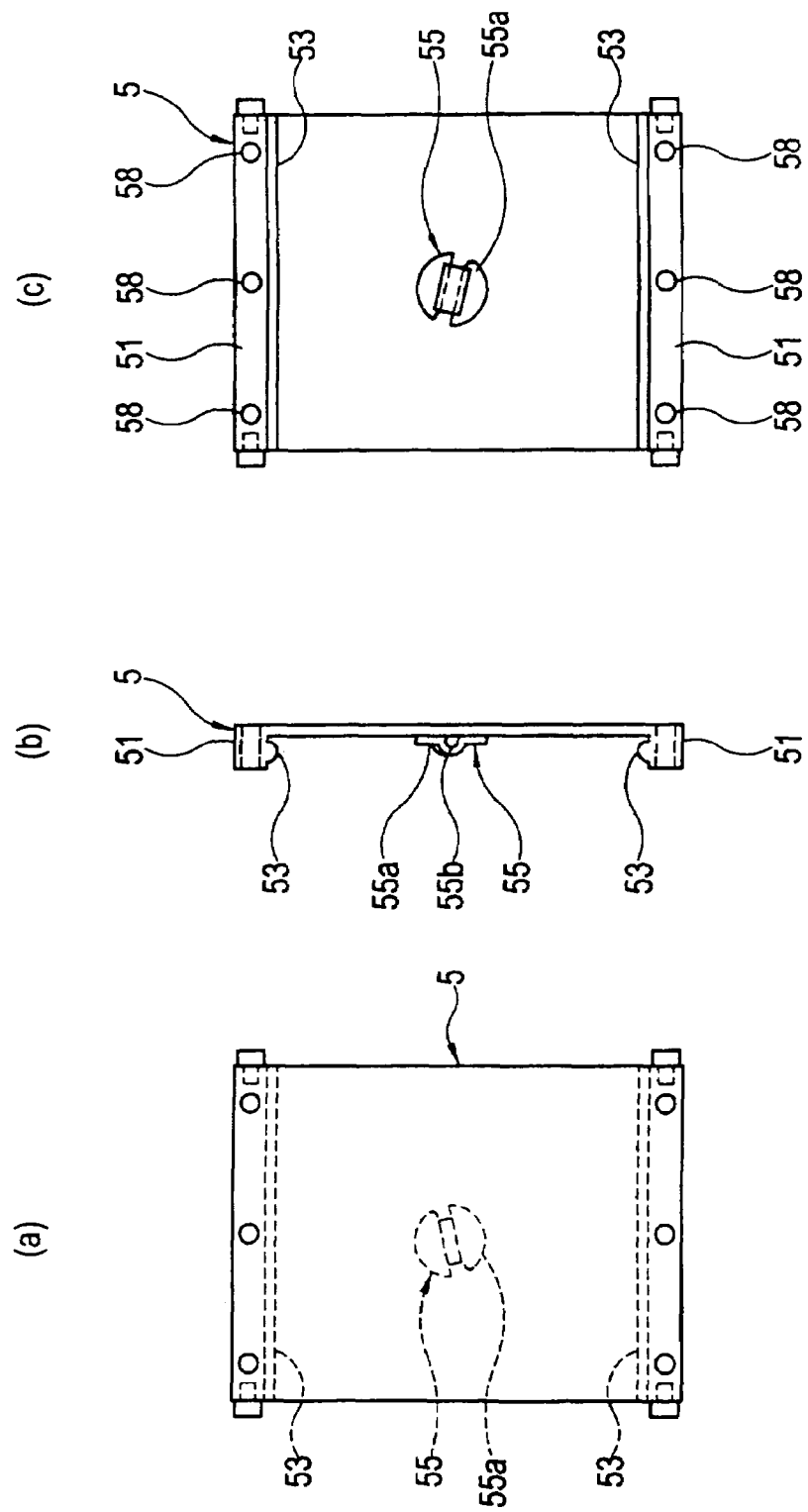
FIGS. 7(a), 7(b) and 7(c) are views showing an example of a base member according to the present invention, in which 7(a) is a plan view, 7(b) is a front view, and 7(c) is a back view.
Figure 9:
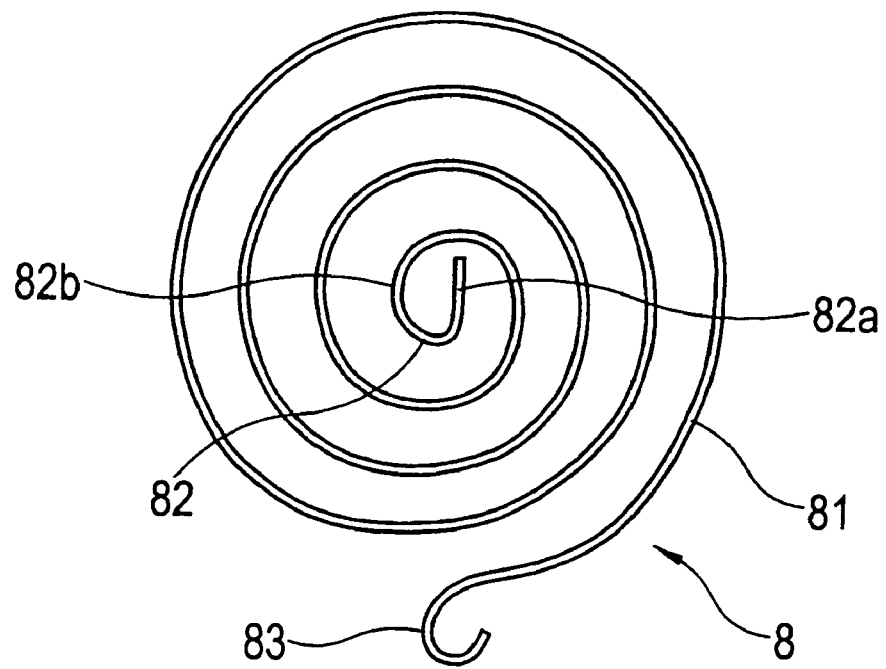
FIG. 9 is a plan view showing an example of the energizing member according to the present invention.

As shown in FIG. 5 and FIG. 9, the spring 81 is formed by spirally extending on the same plane (including the almost same plane) centering a base end portion 82 as the other end part, and energizes, for example, the rotary arm 7 which is mounted on a free end portion 83 as one end part toward a substantially circumferential direction which is opposite to its spiral direction.

The base end portion 82 of the spiral 81 is constituted of a linear portion 82a which is inserted into the fitting hole 55b of the fixing portion 55 provided on the inner surface of the base member 5, and a curved portion 82b which extends from the linear portion 82a and abuts against or comes close to a part of or the entire periphery of the fitting portion 55a of the fixing portion 55, and is detachably fixed in the fixing portion 55.

The free end portion 83 of the spring 81 is bent in the opposite direction to the spiral direction in a substantially circular shape, and the pivot portion 12a of the pivot pin 12 which is mounted on the rotary arm 7 is inserted into the free end portion 83, so that the rotary arm 7 is pivotally fitted into the free end portion 83 of the spring 81 via the pivot pin 12. It is preferable that the inside diameter of the free end portion 83 is formed to have the size larger than, for example, slightly larger than the outside diameter of the pivot portion 12a of the pivot pin 12.

The size of the spring 81 is not particularly limited as long as it can be located on the inner surface of the base member 5. Further, it is preferable that the spring 81 is so formed that its energizing force is generated at all times toward the substantially circumferential direction which is opposite to the spiral direction. The spring 81, rotary arm 7, base member 5 and slider 4 are so constituted that the free end portion 83 is at the position opposite to the stopper 42 at the approximate center part in the width direction of the base member 5, and the energizing direction thereof is a substantially circumferential direction a (described in FIG. 1) of the pivotal point of the rotary arm 7, when the slider 4 which is slidingly engaged with the base member 5 is in the closed state. Further, these are so constituted that, when the slider 4 is slid relative to the base member 5 from the closed state to the open state, the energizing force applied onto the tip portion of the rotary arm 7 may be toward the direction of the pivotal point of the rotary arm 7, and the tip portion of the rotary arm 7 moves along the substantially semicircular shape of the spring 81, during the slide. Moreover, these are so constituted that, when the slider 4 is in the open state, the tip portion of the rotary arm 7 is positioned closer to the one side part of the base member 5 (end side near the rotary arm 7 is rotatably mounted) than the line connecting the center of the spring 81 and the pivotal point of the rotary arm 7.

Figure 12:
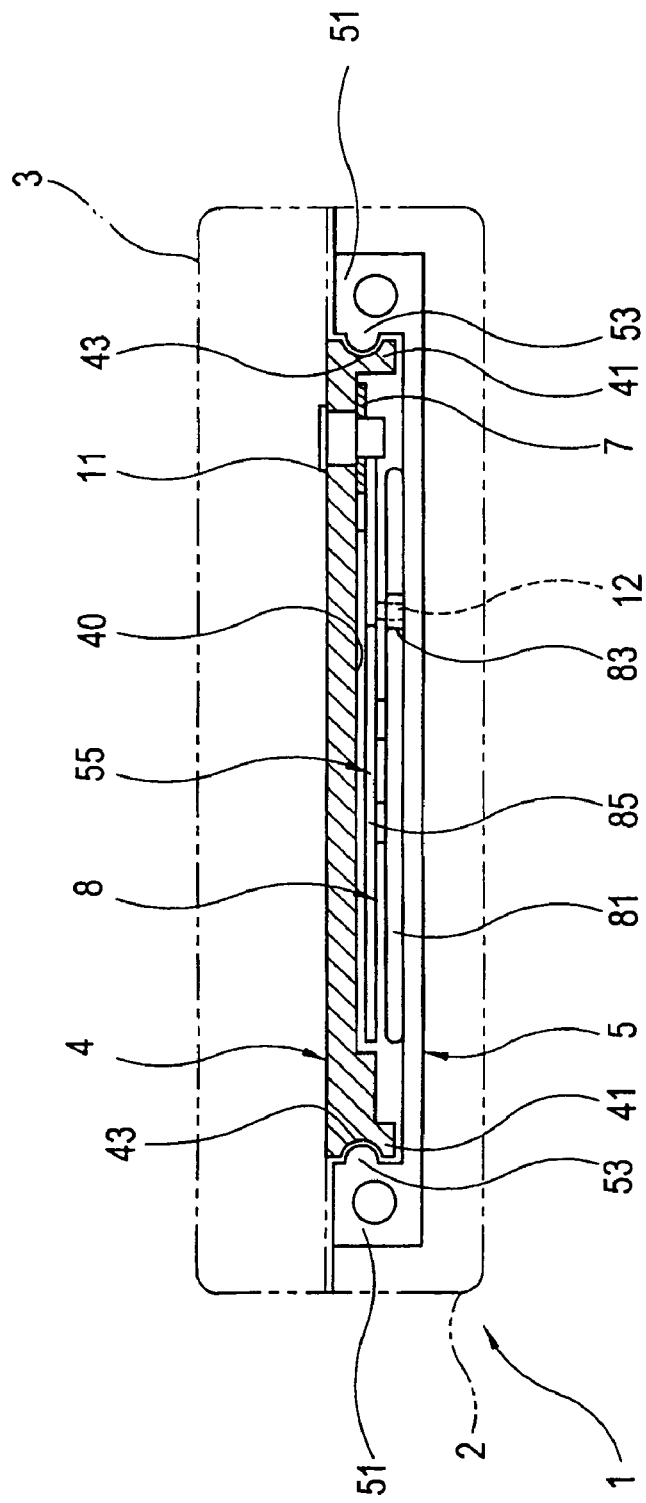
FIG. 12 is a sectional view showing another example of the slide mechanism of the portable device according to the present invention.

The material of the spring 81 is not particularly limited and a round wire having a circular cross section or a square wire having a rectangular cross section may be used. When the round wire is used, however, buckling may be caused in an axial direction of the spring when the load is placed thereon, and therefore a plate 85 may be provided on the inner surface of the base member 5, for example, on the fixing portion 55, in order to prevent the buckling, as shown in FIG. 12. This plate 85 is formed as a flat plate extending substantially in parallel to the inner surface of the base member 5. It is preferable that the plate 85 is provided on the fixing portion 55 so as to leave a space larger than, for example, slightly larger than the thickness of the spring 81 (diameter of the round wire) between the inner surface of the base member 5. Further, the plate 85 is formed to have the shape which does not interrupt the rotation of the rotary arm 7, and sandwiches the spring 81 between the inner surface of the base member 5.

Next, the operation of the slide mechanism of the portable device according to the present invention will be explained.

As shown in FIG. 1 to FIG. 4, the base member 5 and the slider 4 are respectively mounted on the first casing 2 and the second casing 3, for example. In the closed state in which the first casing 2 and the second casing 3 are mutually superposed, as shown in FIG. 1, the energizing force of the spring 81 of the slide energizing means 6 allows the tip portion of the rotary arm 7 to be energized toward the side of one rail portion 41 of the slider 4, the base member 5 to be abutted against the stopper 42, and the base member 5 and the slider 4 to be engaged with each other. That is, the energizing force of the spring 81 energizes the base end portion 82 of the spring 81 toward the direction moving away from the shaft 11 centering the shaft 11 of the rotary arm 7, and therefore the closed state in which the first casing 2 and the second casing 3 are mutually superposed is maintained. Incidentally, a lock mechanism may be provided in order to maintain the closed state more securely.

When the first casing 2, second casing 3, or both of the casings 2 and 3 is/are slid from the direction of the closed state toward the direction of the open state, the tip portion of the rotary arm 7 rotates toward the opposite side to the stopper 42 centering on the shaft 11. At this time, the slide force acts on the spring 81, and the spring 81 receives the load and resists the energizing force to extend in the circumferential direction.

Figure 2:
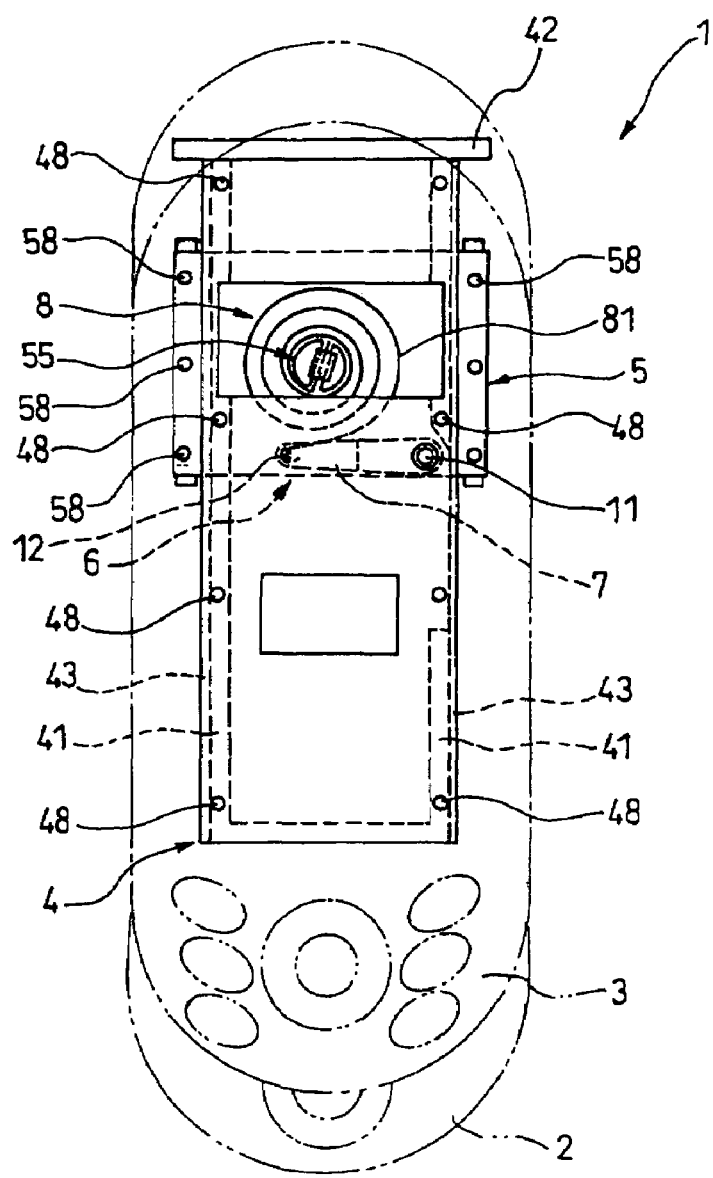
FIG. 2 is a plan view explaining opening operation of the slide mechanism of the portable device according to the present invention.
Figure 3:
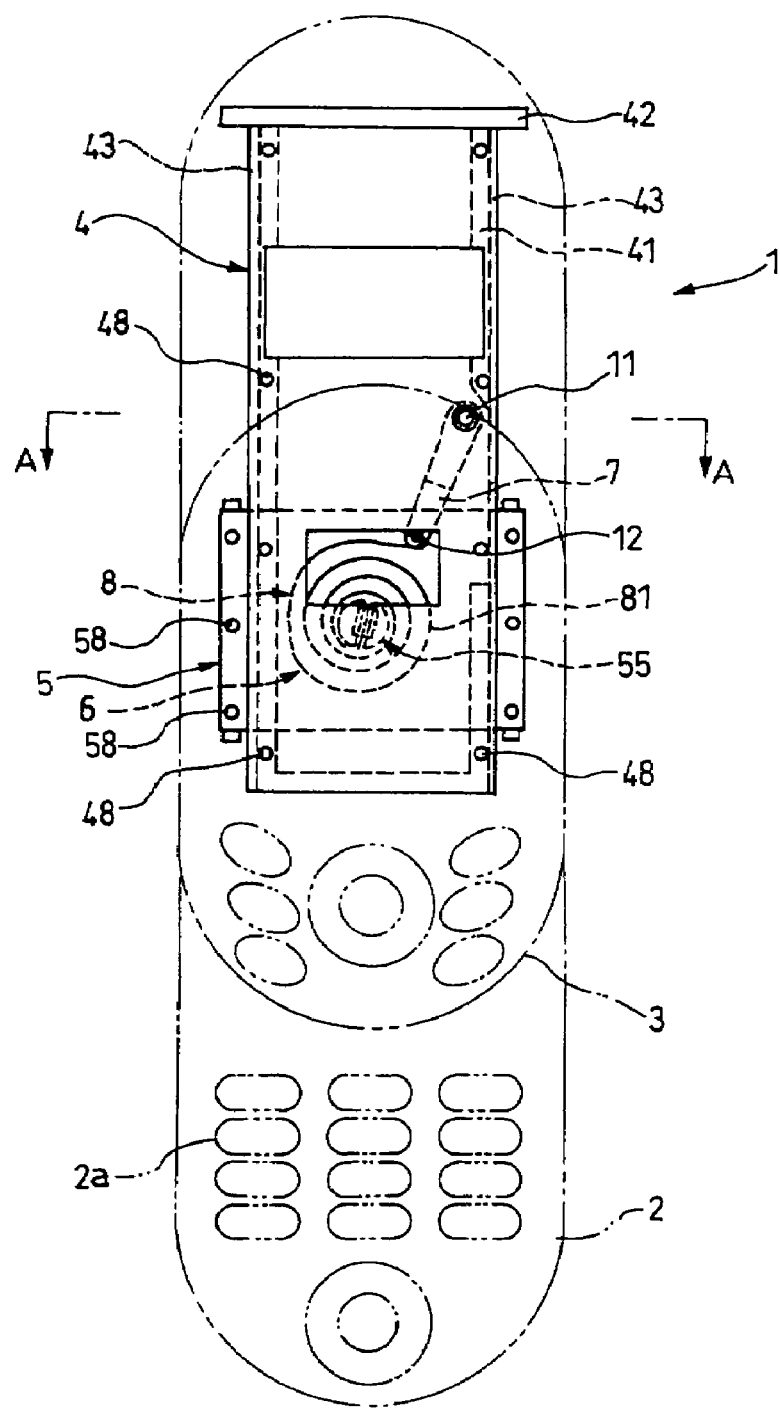
FIG. 3 is a plan view explaining an open state of the slide mechanism of the portable device according to the present invention.
Figure 4:
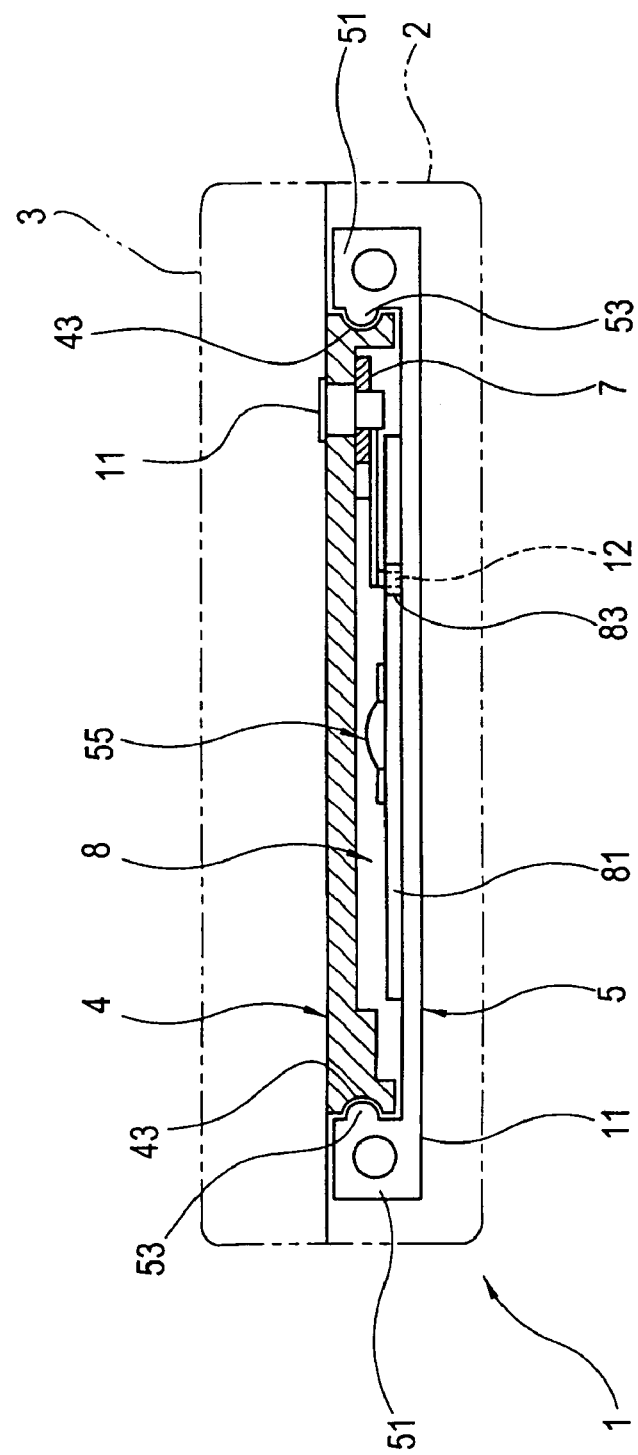
FIG. 4 is a sectional view taken along the A-A line in FIG. 3.

When the energizing force of the spring 81 applied on the free end portion of the rotary arm 7 centering the base end portion 82 of the spring 81 is toward the direction of the shaft 11 (including the direction of nearly the shaft), as shown in FIG. 2, the energizing force toward the slide direction applied on the base member 5 disappears (including nearly disappears). Namely, the slide force becomes zero. After this state (also referred to as the neutral state), the position of the pivotal point of the rotary arm 7 (center of the shaft 11) and the position of the free end portion thereof are relatively reversed, and the energizing force of the spring 81 energizes the base end portion 82 of the spring 81 toward the direction moving away from the shaft 11 centering the shaft 11, and therefore the free end portion of the rotary arm 7 is energized toward the side of one rail portion 41 of the slider 4. As a result of this, the casings 2 and 3, and the base member 5 and slider 4 slidingly move in an automatic manner, and the rotary arm 7 rotates (and also swings in this case), whereby the base member 5 abuts against the controlling member to become the open state, as shown in FIG. 3.

In this open state as well, the pivotal point of the rotary arm 7 and the base end portion 82 of the spring 81, which are the both end parts of the slide energizing means 6, are not on the line connecting the center of the spring 81 and the pivotal point of the rotary arm 7, and the tip portion of the rotary arm 7 is positioned closer to the side of one rail portion 41 of the slider 4. Accordingly, the energizing force of the spring 81 energizes the base end portion 82 of the spring 81 toward the direction moving away from the shaft 11 centering the shaft 11. As a result of this, the state in which the base member 5 is abutted against the controlling member, that is, the open state is maintained. Since the keyboard section 2a provided on the upper surface of the first casing 2 is thereby exposed, telephone call and keyboard operation are made possible. Incidentally, a lock mechanism may be provided in order to maintain the open state more securely. Thus, the slide operation can be performed semiautomatically when it is moved slidingly from the closed state to the open state.

When the first casing 2, second casing 3, or both of the casings 2 and 3 is/are slid from the direction of the open state toward the direction of the closed state, the spring 81 resists the energizing force to extend in the circumferential direction. After the neutral state, the position of the pivotal point of the rotary arm 7 and the position of the tip portion thereof are relatively reversed, and then the energizing force of the spring 81 energizes the base end portion 82 of the spring 81 toward the direction moving away from the shaft 11 centering the shaft 11. As a result of this, the casings 2 and 3, and the base member 5 and slider 4 slidingly move in the automatic manner, and the rotary arm 7 rotates, whereby the casings 2 and 3 slidingly move in the automatic manner and the base member 5 abuts against the stopper 42 to become the closed state. Thus, the slide operation can be performed semiautomatically when it is moved slidingly from the open state to the closed state.

Therefore, according to the slide mechanism 1 of the portable device of the present invention, it is possible to slide the first casing 2 and the second casing 3 semiautomatically by the simple structure of the rotary arm 7 and the spring 81, and to improve operationality.

Since the slide operation is performed semiautomatically using the rotary arm 7 and the spring 81, the number of the parts is reduced, so that the cost and size can be reduced. Further, by changing elastic characteristics and the like of the energizing member 8 of the spring 81 and the like and the position and length of the rotary arm 7, it is possible to set various slide operation. For example, when the energizing force of the slide energizing means 6 in the closed state and open state is increased, it is possible to increase the force to maintain the closed state and open state, and to maintain the closed state and open state without fail. Moreover, since a slide member such as a cam is not used, the operating force is not reduced by friction.

As described thus far, the slide mechanism according to the present invention has the simple structure and the improved operationality because the first casing and the second casing can be slid semiautomatically, and therefore it is preferably used as the slide mechanism of the portable telephone in particular, among portable terminal devices.

What is claimed is:

1. A slide mechanism of a portable device for relatively sliding a first casing and a second casing, which constitute the portable device, in a mutually superposed state to be openable/closable in a linear direction, comprising:
    a base member mounted on either one of the first casing and the second casing;
    a slider slidably engaged with said base member and mounted on the other of the first casing and the second casing; and
    a slide energizing means provided between said slider and said base member,
    wherein said base member has a pair of rail portions erected from its bottom surface part at its both side parts, which are structured so that said slider slides by abutting against the rail portions,
    wherein said slider is provided with guide portions contacting respective side parts of the rail portions at its side end parts,
    wherein recessed strip portions or projecting strip portions are provided to the respective rail portions on sides contacting the guide portions, and projecting strip portions or recessed strip portions which engage with the recessed strip portions or projecting strip portions are provided to the respective guide portions on sides contacting the respective rail portions, and wherein said slide energizing means is constituted of a rotary arm rotatably mounted on either one of said base member and said slider, and an energizing member mounted on the other of said base member and said slider, allowing the first casing and the second casing to automatically open/close from a predetermined opening/closing position by acting on the rotary arm to energize the rotary arm to rotate from a predetermined rotary position to both of right and left directions.

2. The slide mechanism of the portable device according to claim 1, wherein said slide energizing means is constituted of the rotary arm which is pivotally mounted at its one end part on an approximate center part of an one side part side of said base member, and the energizing member which is elastic in a circumferential direction, pivotally fitted at its free end portion on an one end part side with a free end part of the rotary arm as the other end part, and fixed at its other end part to said slider.

3. A slide mechanism of a portable device for relatively sliding a first casing and a second casing, which constitute the portable device, in a mutually superposed state to be openable/closable in a linear direction, comprising:
a base member mounted on either one of the first casing and the second casing;
a slider slidably engaged with said base member and mounted on the other of the first casing and the second casing,
a slide energizing means provided between said slider and said base member,
wherein said base member has a pair of rail portions erected from its bottom surface part at its both side parts, which are structured so that said slider slides by abutting against the rail portions,
wherein said slider is provided with guide portions contacting respective side parts of the rail portions at its side end parts, and
wherein recessed strip portions or projecting strip portions are provided to the respective rail portions on sides contacting the guide portions, and projecting strip portions or recessed strip portions which engage with the recessed strip portions or projecting strip portions are provided to the respective guide portions on sides contacting the respective rail portions, and
wherein said slide energizing means is provided between the bottom surface part of said base member and said slider, and between the rail portions of said base member and the guide portions of said slider, and constituted of a rotary arm rotatably mounted on either one of said base member and said slider, and an energizing member mounted on the other of said base member and said slider, allowing the first casing and the second casing to automatically open/close from a predetermined opening/closing position by acting on the rotary arm to energize the rotary arm to rotate from a predetermined rotary position to both of right and left directions.

4. The slide mechanism of the portable device according to claim 1, wherein said slide energizing means comprises a spring.

5. The slide mechanism of the portable device according to claim 4, wherein said spring is mounted on said slider and said rotary arm mounted on said base member, and respective free end portions of said spring and said rotary arm are rotatably connected to each other, thereby allowing said slider to be slidably energized from a sliding position with regard to said base member in an opening direction and closing direction.

6. The slide mechanism of the portable device according to claim 1 wherein the portable device is a portable telephone.

7. A slide mechanism of a portable device for relatively sliding a first casing and a second casing, which constitute the portable device, in a mutually superposed state to be openable/closable in a linear direction, comprising:
a base member mounted on either one of the first casing and the second casing;
a slider slidably engaged with said base member and mounted on the other of the first casing and the second casing; and
a slide energizing means provided between said slider and said base member,
wherein said base member has a pair of rail portions erected from its bottom surface part at its both side parts, which are structured so that said slider slides by abutting against the rail portions,
wherein said slider is provided with guide portions contacting respective side parts of the rail portions at its side end parts,
wherein recessed strip portions or projecting strip portions are provided to the respective rail portions on sides contacting the guide portions, and projecting strip portions or recessed strip portions which engage with the recessed strip portions or projecting strip portions are provided to the respective guide portions on sides contacting the respective rail portions, and
wherein said slide energizing means is constituted of a rotary arm rotatably mounted on said base member and an energizing member mounted on said slider, and respective free end portions of said energizing member and said rotary arm are rotatably connected to each other, thereby allowing said slider to be slidably energized from a sliding position with regard to said base member in an opening direction and closing direction.

* * * * *